US008902780B1

(12) United States Patent
Hegde et al.

(10) Patent No.: US 8,902,780 B1
(45) Date of Patent: Dec. 2, 2014

(54) FORWARDING DETECTION FOR POINT-TO-MULTIPOINT LABEL SWITCHED PATHS

(71) Applicant: Juniper Networks, Inc., Sunnyvale, CA (US)

(72) Inventors: Vikas Hegde, Bangalore (IN); Santosh Pallagatti Kotrabasappa, Bangalore (IN); Chandrasekar Ramachandran, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 104 days.

(21) Appl. No.: 13/627,660

(22) Filed: Sep. 26, 2012

(51) Int. Cl.
*H04L 12/26* (2006.01)
*H04L 12/723* (2013.01)
*H04L 12/721* (2013.01)
*H04L 12/24* (2006.01)
*H01L 43/10* (2006.01)

(52) U.S. Cl.
CPC ............ *H04L 45/50* (2013.01); *H04L 41/0677* (2013.01); *H01L 43/10* (2013.01); *H04L 43/0811* (2013.01); *H04L 45/70* (2013.01)
USPC ........................................................ 370/252

(58) Field of Classification Search
CPC ..... H04L 47/10; H04L 43/50; H04L 12/2697; H04L 43/0852; H04L 43/00
USPC ........................................................ 370/252
See application file for complete search history.

(56) References Cited

U.S. PATENT DOCUMENTS

| | | | |
|---|---|---|---|
| 5,253,248 A | 10/1993 | Dravida et al. | |
| 5,848,128 A | 12/1998 | Frey | |
| 6,173,411 B1 | 1/2001 | Hirst et al. | |
| 6,304,546 B1 | 10/2001 | Natarajan et al. | |
| 6,453,430 B1 | 9/2002 | Singh et al. | |
| 6,507,869 B1 | 1/2003 | Franke et al. | |
| 6,542,934 B1 | 4/2003 | Bader et al. | |

(Continued)

FOREIGN PATENT DOCUMENTS

| | | |
|---|---|---|
| EP | 1367750 A1 | 12/2003 |
| EP | 1861963 A2 | 12/2007 |

(Continued)

OTHER PUBLICATIONS

Kompella et al., "Detecting Multi-Protocol Label Switched (MPLS) Data Plane Failures," Network Working Group, RFC 4379, Cisco Systems, Inc., Feb. 2006, 50 pp.

(Continued)

*Primary Examiner* — Charles C Jiang
*Assistant Examiner* — Thad Defauw
(74) *Attorney, Agent, or Firm* — Shumaker & Sieffert, P.A.

(57) ABSTRACT

Techniques are described for verifying the connectivity status of multiple paths through a computer network. The techniques may be useful in testing the connectivity of label switched paths (LSPs), and particularly useful point-to-multipoint (P2MP) LSPs. In some embodiments, a P2MP label switched path (LSP) ping protocol may be used a first connectivity verification protocol for the P2MP LSP and a Multipoint Bidirectional Forwarding Detection (MP BFD) protocol may be used as a second connectivity verification protocol. In addition, use of the LSP ping protocol for connectivity testing of the P2MP LSP may be used to boot-strap session information for MP BFD sessions with egress devices of the P2MP LSP.

22 Claims, 3 Drawing Sheets

(56) References Cited

U.S. PATENT DOCUMENTS

| | | |
|---|---|---|
| 6,618,360 B1 | 9/2003 | Scoville et al. |
| 6,751,188 B1 | 6/2004 | Medved et al. |
| 6,850,253 B1 | 2/2005 | Bazerman et al. |
| 6,910,148 B1 | 6/2005 | Ho et al. |
| 6,982,953 B1 | 1/2006 | Swales |
| 7,055,063 B2 | 5/2006 | Leymann et al. |
| 7,120,693 B2 | 10/2006 | Chang et al. |
| 7,130,304 B1 | 10/2006 | Aggarwal |
| 7,139,263 B2 | 11/2006 | Miller et al. |
| 7,151,775 B1 | 12/2006 | Renwick et al. |
| 7,161,946 B1 | 1/2007 | Jha |
| 7,184,437 B1 | 2/2007 | Cole et al. |
| 7,206,836 B2 | 4/2007 | Dinker et al. |
| 7,219,030 B2 | 5/2007 | Ohtani |
| 7,236,453 B2 | 6/2007 | Visser et al. |
| 7,359,377 B1 | 4/2008 | Kompella et al. |
| 7,362,700 B2 | 4/2008 | Frick et al. |
| 7,391,719 B2 | 6/2008 | Ellis et al. |
| 7,406,030 B1 | 7/2008 | Rijsman |
| 7,406,035 B2 | 7/2008 | Harvey et al. |
| 7,433,320 B2 | 10/2008 | Previdi et al. |
| 7,447,167 B2 | 11/2008 | Nadeau et al. |
| 7,471,638 B2 | 12/2008 | Torrey et al. |
| 7,506,194 B2 | 3/2009 | Appanna et al. |
| 7,508,772 B1 | 3/2009 | Ward et al. |
| 7,522,599 B1 * | 4/2009 | Aggarwal et al. ............ 370/390 |
| 7,523,185 B1 | 4/2009 | Ng et al. |
| 7,561,527 B1 | 7/2009 | Katz et al. |
| 7,609,637 B2 | 10/2009 | Doshi et al. |
| 7,639,624 B2 | 12/2009 | McGee et al. |
| 7,724,677 B2 | 5/2010 | Iwami |
| 7,738,367 B1 | 6/2010 | Aggarwal et al. |
| 7,765,306 B2 | 7/2010 | Filsfils et al. |
| 7,852,778 B1 * | 12/2010 | Kompella ..................... 370/248 |
| 7,940,646 B1 | 5/2011 | Aggarwal et al. |
| 7,957,330 B1 | 6/2011 | Bahadur et al. |
| 7,990,888 B2 | 8/2011 | Nadeau et al. |
| 8,503,293 B2 | 8/2013 | Raszuk |
| 2002/0093954 A1 | 7/2002 | Weil et al. |
| 2003/0112749 A1 * | 6/2003 | Hassink et al. ............... 370/225 |
| 2005/0083936 A1 | 4/2005 | Ma |
| 2005/0195741 A1 | 9/2005 | Doshi et al. |
| 2005/0259634 A1 | 11/2005 | Ross |
| 2005/0281192 A1 | 12/2005 | Nadeau et al. |
| 2006/0095538 A1 | 5/2006 | Rehman et al. |
| 2006/0133300 A1 | 6/2006 | Lee et al. |
| 2006/0233107 A1 | 10/2006 | Croak et al. |
| 2006/0239201 A1 | 10/2006 | Metzger et al. |
| 2006/0262772 A1 | 11/2006 | Guichard et al. |
| 2006/0285500 A1 | 12/2006 | Booth et al. |
| 2007/0041554 A1 | 2/2007 | Newman et al. |
| 2007/0061103 A1 | 3/2007 | Patzschke et al. |
| 2007/0165515 A1 | 7/2007 | Vasseur |
| 2007/0180104 A1 | 8/2007 | Filsfils et al. |
| 2007/0180105 A1 | 8/2007 | Filsfils et al. |
| 2007/0207591 A1 | 9/2007 | Rahman et al. |
| 2007/0220252 A1 | 9/2007 | Sinko |
| 2007/0263836 A1 | 11/2007 | Huang |
| 2007/0280102 A1 | 12/2007 | Vasseur et al. |
| 2008/0004782 A1 | 1/2008 | Kobayashi et al. |
| 2008/0049622 A1 | 2/2008 | Previdi et al. |
| 2008/0074997 A1 | 3/2008 | Bryant et al. |
| 2008/0247324 A1 | 10/2008 | Nadeau et al. |
| 2008/0253295 A1 | 10/2008 | Yumoto et al. |
| 2009/0016213 A1 | 1/2009 | Lichtwald |
| 2009/0019141 A1 | 1/2009 | Bush et al. |
| 2009/0046579 A1 | 2/2009 | Lu et al. |
| 2009/0046723 A1 | 2/2009 | Rahman et al. |
| 2009/0232029 A1 * | 9/2009 | Abu-Hamdeh et al. ....... 370/255 |
| 2011/0063973 A1 * | 3/2011 | VenkataRaman et al. .... 370/228 |
| 2013/0028099 A1 * | 1/2013 | Birajdar et al. ............... 370/242 |

FOREIGN PATENT DOCUMENTS

| | | |
|---|---|---|
| EP | 1864449 A2 | 12/2007 |
| EP | 1891526 A2 | 2/2008 |
| EP | 1891526 B1 | 2/2012 |

OTHER PUBLICATIONS

Katz et al., "Bidirectional Forwarding Detection (BFD)," Internet Engineering Task Force (IETF), RFC 5880, Juniper Networks, Jun. 2010, 49 pp.

Katz et al., "Bidirectional Forwarding Detection (BFD) for IPv4 and IPv6 (Single Hop)," Internet Engineering Task Force (IETF), RFC 5881, Juniper Networks, Jun. 2010, 7 pp.

Katz et al., "Generic Application of Bidirectional Forwarding Detection (BFD)," Internet Engineering Task Force (IETF), RFC 5882, Juniper Networks, Jun. 2010, 15 pp.

Katz et al., "Biderectional Forwarding Detection (BFD) for Multihop Paths," Internet Engineering Task Force (IETF), RFC 5883, Juniper Networks, Jun. 2010, 6 pp.

Aggarwal et al., "Bidirectional Forwarding Detection (BFD) for MPLS Label Switched Paths (LSPs)," Internet Engineering Task Force (IETF), RFC 5884, Cisco Systems, Inc., Jun. 2010, 12 pp.

Nadeau et al., "Bidirectional Forwarding Detection (BFD) for the Pseudowire Virtual Circuit Connectivity Verification (VCCV)," Internet Engineering Task Force (IETF), RFC 5885, Cisco Systems, Inc., Jun. 2010, 11 pp.

Kolon, "BFD spots router forwarding failures," Network World, www.networkworld.com/news/tech/2005/030705techupdate.html, Mar. 7, 2005, 3 pp.

Aggarwl, "OAM Mechanisms in MPLS Layer 2 Transport Networks," IEEE Communications Magazine, Oct. 2004, pp. 124-130.

Atlas, "ICMP Extensions for Unnumbered Interfaces," draft-atlas-icmp-unnumbered-00, Dec. 9, 2005, 8 pp.

Atlas, ICMP Extensions for Unnumbered Interfaces, draft-atlas-icmp-unnumbered-01, Feb. 2006, 8 pp.

Bonica et al., "Generic Tunnel Tracing Protocol (GTTP) Specification," draft-bonica-tunproto-01.txt, IETF Standard-Working-Draft, Internet Engineering Task Force, Jul. 2001, 20 pp.

Berkowitz, "Router Renumbering Guide," Network Working Group, RFC 2072, Jan. 1997, 41 pp.

Mannie, "Generalized Multi-Protocol Label Switching Architecture," Network Working Group, Internet draft, draft-ietf-ccamp-gmpls-architecture-07.txt, May 2003, 56 pp.

Kompella et al., Signalling Unnumbered Links in Resource ReSerVation Protocol—Traffic Engineering (RSVP-TE), Network Working Group, RFC 3477, Jan. 2003, 8 pp.

Sun Hai-feng, "Advanced TCP Port Scan and it's Response," O.L. Automation 2005, vol. 24, No. 4, China Academic Electronic Publishing House, http://www.cnki.net, Apr. 24, 2005, 2 pp. (Abstract only).

"Using the IP unnumbered configuration FAQ," APNIC, www.apnic.net/info/faq/ip_unnumb.html, Jul. 1, 2005, 2 pp.

"Configure the loopback Interface," www.juniper.net/techpubs/software/junos/junos56/index.html, Last printed Nov. 7, 2005, 2 pp.

Zvon, RFC 2072, [Router Renumbering Guide]—Router Identifiers, Chapter 8.3, Unnumbered Interfaces, www.zvon.org/tmRFC/RFC2072/output/chapter8.html , last printed on Nov. 7, 2005, 2 pp.

"ICMP (Internet Control Message Protocol)," Data Network Resource, www.rhyshaden.com/icmp.html, last printed Nov. 10, 2005, 4 pp.

"Traceroute," Webopedia, www.webopedia.com/TERM/t/traceroute.heml, Aug. 26, 2004, 1 p.

"RFC 2151—(rfc2151)—A primer on Internet and TCP/IP Tools and Utilities," www.rfcsearch.org/rfcview/RFC/2151.html, last printed Nov. 9, 2005, 3 pp.

Gorry Fairhurst, "Internet Control Message protocol," Internet Control Protocol, (ICMP), www.erg.abdn.ac.uk/users/gorry/course/inet-pages/icmp.html, last printed Sep. 6, 2006, 3 pp.

(56) References Cited

OTHER PUBLICATIONS

"ActiveXperts Ping backgrounds (PING is part of the ActiveSocket Toolkit)," ActiveSocket Network Communication Toolkit 2.4, Activexperts, www.activexperts.com/activsocket/toolkits/ping.html, last printed Nov. 10, 2005, 3 pp.

Vijay Mukhi et al., "Internet Control Message Protocol ICMP," www.vijaymukhi.com/vmis/icmp, last printed Sep. 6, 2006, 5pp.

"Configure an Unnumbered Interface," www.juniper.net/techpubs/software/junos/junos56/index.html, last printed Nov. 7, 2005, 1 p.

Chen et al., "Dynamic Capability for BGP—4," Network Working Group, Internet Draft, draft-ietf-idr-dynamic-cap-03.txt, Dec. 2002, 6 pp.

Sangli et al., "Graceful Restart Mechanism for BGP," Network Working Group, Internet Draft, draft-ietf-idr-restart-06.txt, http://toolsietf.ort/html/draft-ietf-idr-restart-06, Jan. 2003, 10 pp.

Katz et al., "BFD for Multipoint Networks," Network Working Group, Internet Draft, draft-ietf-bfd-multipoint-00.txt, Oct. 2011, 29 pp.

Saxena et al., "Detecting Data-Plane Failures in Point-to-Multipoint Mpls—Extensions to LSP Ping," Internet Engineering Task Force (IETF) RFC 6425, Nov. 2011, 28 pp.

Hedge et al., "Multipoint BFD for MPLS," Network Working Group, Internet-Draft, draft-chandra-hedge-mpoint-bfd-for-mpls-00.txt, Mar. 2012, 12 pp.

\* cited by examiner

FORWARDING DETECTION FOR POINT-TO-MULTIPOINT LABEL SWITCHED PATHS

TECHNICAL FIELD

The invention relates to computer networks, and, in particular, to connection verification in computer networks.

BACKGROUND

A computer network is composed of a set of nodes and a set of links that connect one node to another. For instance, a computer network may be composed of a set of routers while the set of links may be cables between the routers. When a first node in the network sends a message to a second node in the network, the message may pass through many links and many nodes. The links and nodes the message passes through while traveling from the first node to the second node is referred to as a path. For example, suppose the message passes through a third node while traveling from the first node to the second node. In this case, the path leads from the first node to the third node to the second node.

Packet-based computer networks increasingly utilize label switching protocols for traffic engineering and other purposes. In a label switching network, label switching routers (LSRs) use Multi-Protocol Label Switching (MPLS) signaling protocols to establish label switched paths (LSPs). The LSRs utilize MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR.

Point-to-multipoint (P2MP) label switched paths (LSPs) are increasingly being used. For example, P2MP LSPs are often used to carry multicast traffic, such as Internet Protocol Television (IPTV), desktop conferences, corporate broadcasts, music and video web casts, and other forms of multimedia content. P2MP LSPs may be used with private network instances, such as, multicast virtual private local area network service (multicast VPLS) instances, multicast virtual private network (MVPN) instances, and Internet Protocol (IP) multicast instances.

Links and nodes in a computer network may fail without warning. Consequently, one of the LSPs that the first node was using to communicate with the second node may stop functioning. To ensure that the first node and the second node do not send messages on a LSP that is not functioning, the nodes may periodically verify the status of the path by sending a message through the path and receiving a response through the path.

One mechanism for verifying connectivity along an LSP, referred to as "LSP ping," is described by RFC4379 Kompella, K. and G. Swallow, "Detecting Multi-Protocol Label Switched (MPLS) Data Plane Failures", RFC 4379, February 2006, hereby incorporated herein by reference. In general, LSP ping utilizes a form of MPLS "echo requests" and "echo replies" for detecting MPLS data plane failures and for verifying the MPLS LSP data plane against the control plane. However, in some situations, verifying the connectivity along a P2MP LSPs using LSP ping may be difficult due to relatively significant control plane processing required for LSP ping messages.

SUMMARY

In general, techniques are described for verifying the connectivity status of multiple paths through a computer network. The techniques may be useful in testing the connectivity of label switched paths (LSPs), and particularly useful point-to-multipoint (P2MP) LSPs. In some embodiments, a P2MP label switched path (LSP) ping protocol may be used as a first connectivity verification protocol for the P2MP LSP and a Multipoint Bidirectional Forwarding Detection (MP BFD) protocol may be used as a second connectivity verification protocol for the P2MP LSP. Further details on the MP BFD protocol are described in D. Katz and D. Ward, "BFD for Multipoint Networks," Internet Engineering Task Force (IETF), draft-ietf-bfd-multipoint-00.txt, Oct. 11, 2011, incorporated herein by reference. Further, as described herein, use of the P2MP LSP ping protocol for connectivity testing of the P2MP LSP may be used to boot-strap session information for MP BFD sessions with egress devices of the P2MP LSP.

In one example, a method of verifying connectivity of paths through a computer network containing a plurality of network devices comprises establishing a Multi-Protocol Label Switching (MPLS) point-to-multipoint (P2MP) label switched path (LSP) for transporting packets through a network. The P2MP LSP includes a source device providing an ingress to the P2MP LSP and a plurality of destination devices providing a plurality of different egress devices from the P2MP LSP. The method further comprises using a P2MP Label Switched Path (LSP) ping protocol to send an LSP ping echo request along the P2MP LSP. The LSP ping echo request embeds a discriminator to establish a Multipoint Bidirectional Forwarding Detection (MP BFD) session for testing connectivity of the P2MP LSP in accordance with the MP BFD protocol. In addition, the LSP ping echo request includes an indicator specifying that the egress devices of the P2MP LSP should not reply to the LSP ping echo request with an LSP ping echo reply to establish the MP BFD session. The method further comprises, without receiving an LSP ping echo reply from the egress routers, outputting packets with the ingress device according to the MP BFD protocol for the MP BFD session for connectivity verification of the P2MP LSP.

In another example, a network device comprises a control unit to establish a Multi-Protocol Label Switching (MPLS) point-to-multipoint (P2MP) label switched path (LSP) for transporting packets through a network. The P2MP LSP includes a source device providing an ingress to the P2MP LSP and a plurality of destination devices providing a plurality of different egress devices from the P2MP LSP. The network device further comprises a P2MP Label Switched Path (LSP) ping protocol executing within the control unit to send an LSP ping echo request along the P2MP LSP. The LSP ping echo request embeds a discriminator to establish a Multipoint Bidirectional Forwarding Detection (MP BFD) session for testing connectivity of the P2MP LSP in accordance with the MP BFD protocol. Moreover, the LSP ping echo request includes an indicator specifying that the egress devices of the P2MP LSP should not reply to the LSP ping echo request with an LSP ping echo reply to establish the MP BFD session. A MP BFD protocol module, without receiving an LSP ping echo reply from the egress routers, outputs packets according to the MP Bidirectional Forwarding Detection protocol for the MP BFD session for connectivity verification of the P2MP LSP.

In another example, a method of verifying connectivity of paths through a computer network containing a plurality of network devices comprises establishing a Multi-Protocol Label Switching (MPLS) point-to-multipoint (P2MP) label switched path (LSP) for transporting packets through a network. The P2MP LSP includes a source device providing an ingress to the P2MP LSP and a plurality of destination devices providing a plurality of different egress devices from the P2MP LSP. The method further comprises detecting, with an application service executing within the computer network, a new egress device joining the application service and providing an egress to the P2MP LSP and, with the application service, directing the source device to use a P2MP Label Switched Path (LSP) ping protocol to send an LSP ping echo request along the P2MP LSP and addressed to the new egress device The LSP ping echo request embeds a discriminator to establish a Multipoint Bidirectional Forwarding Detection (MP BFD) session for testing connectivity of the P2MP LSP in accordance with the MP BFD protocol. The method further comprises outputting packets, with the ingress device, according to the MP Bidirectional Forwarding Detection protocol for the MP BFD session for connectivity verification of the P2MP LSP.

In another example, a network device comprises a control unit having hardware to execute an application service, an Multi-Protocol Label Switching (MPLS) protocol, a point-to-multipoint (P2MP) Label Switched Path (LSP) ping protocol, and a multipoint (MP) Bidirectional Forwarding Detection protocol. The MPLS protocol establishes a Multi-Protocol Label Switching (MPLS) P2MP label switched path (LSP) for transporting packets for the application service through a network, wherein the P2MP LSP includes a source device providing an ingress to the P2MP LSP and a plurality of destination devices providing a plurality of different egress devices from the P2MP LSP. The application service detects a new egress device joining the application service and directs the source device to use the LSP ping protocol to send an LSP ping echo request along the P2MP LSP and addressed to the new egress device. The LSP ping echo request embeds a discriminator to establish a MP Bidirectional Forwarding Detection (BFD) session for testing connectivity of the P2MP LSP in accordance with the MP BFD protocol. In addition, the LSP ping echo request includes an indicator specifying that the egress devices of the P2MP LSP should not reply to the LSP ping echo request with an LSP ping echo reply to establish the MP BFD session. The MP BFD protocol, without receiving an LSP ping echo reply from the egress routers, outputs packets according to the P2MP Bidirectional Forwarding Detection protocol for the P2MP BFD session for connectivity verification of the P2MP LSP.

The techniques may provide certain advantages. For example, the techniques may provide mechanisms by which a tail router of a P2MP LSP is able to detect a loss in connectivity along the multipoint path to a head router of the P2MP LSP, unlike P2MP LSP PING and other mechanisms that are catered towards failure detection at the head router and not at tail routers of the P2MP LSPs. That is, unlike point-to-point LSPs, in many situations it may be beneficial to detect failures of a P2MP LSPs at an egress router of a P2MP LSP rather than solely at an ingress router of the P2MP LSP. For example, by detecting the loss of connectivity of along the multipoint path of a P2MP LSP at an egress router, redundancy may be achieved by allowing the egress router to elect to switch to a backup stream of data rather than the receiver. In addition, utilizing the techniques described herein, various mechanisms like fast switchover and other failure actions can be implemented in the last hop routers of the P2MP LSPs (i.e., the egress routers), such as identifying an alternate source for the P2MP LSP traffic for the receivers.

In one example, the techniques facilitate the use of the unidirectional version of the Multipoint Bidirectional Forwarding Detection (MP BFD) protocol along the multipoint path of the P2MP LSP. This may provide several advantages of using MP BFD over P2MP MPLS LSPs to detect failures in the multipoint path that provides an efficient connectivity test to detect a data plane failure in the forwarding path of the P2MP LSP. Use of P2MP BFD gives the egress routers enough context such that the routers can select between any redundant streams and forward the selected stream to the receivers, thereby reducing the bandwidth requirement between the last hop routers and the receivers since the duplicate streams need not be forwarded to the receivers anymore. Further, for applications of P2MP LSPs that do not have a continuous stream of traffic flowing over the multipoint tree, use of P2MP BFD may ensure that there is a continuous stream of BFD packets being received on the P2MP LSP and any break in the reception of these BFD packets can be used as an indicator that the multipoint forwarding tree for the P2MP LSP has failed. This allows the affected egress routers to respond and invoke failover mechanisms. Further, MP BFD provides a reliable method for detection of failures in the data plane of the multipoint tree. Applications can be built on top of this to leverage the fact that BFD can be run on the hardware and therefore detect failures much faster compared to proprietary solutions at the receiver.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
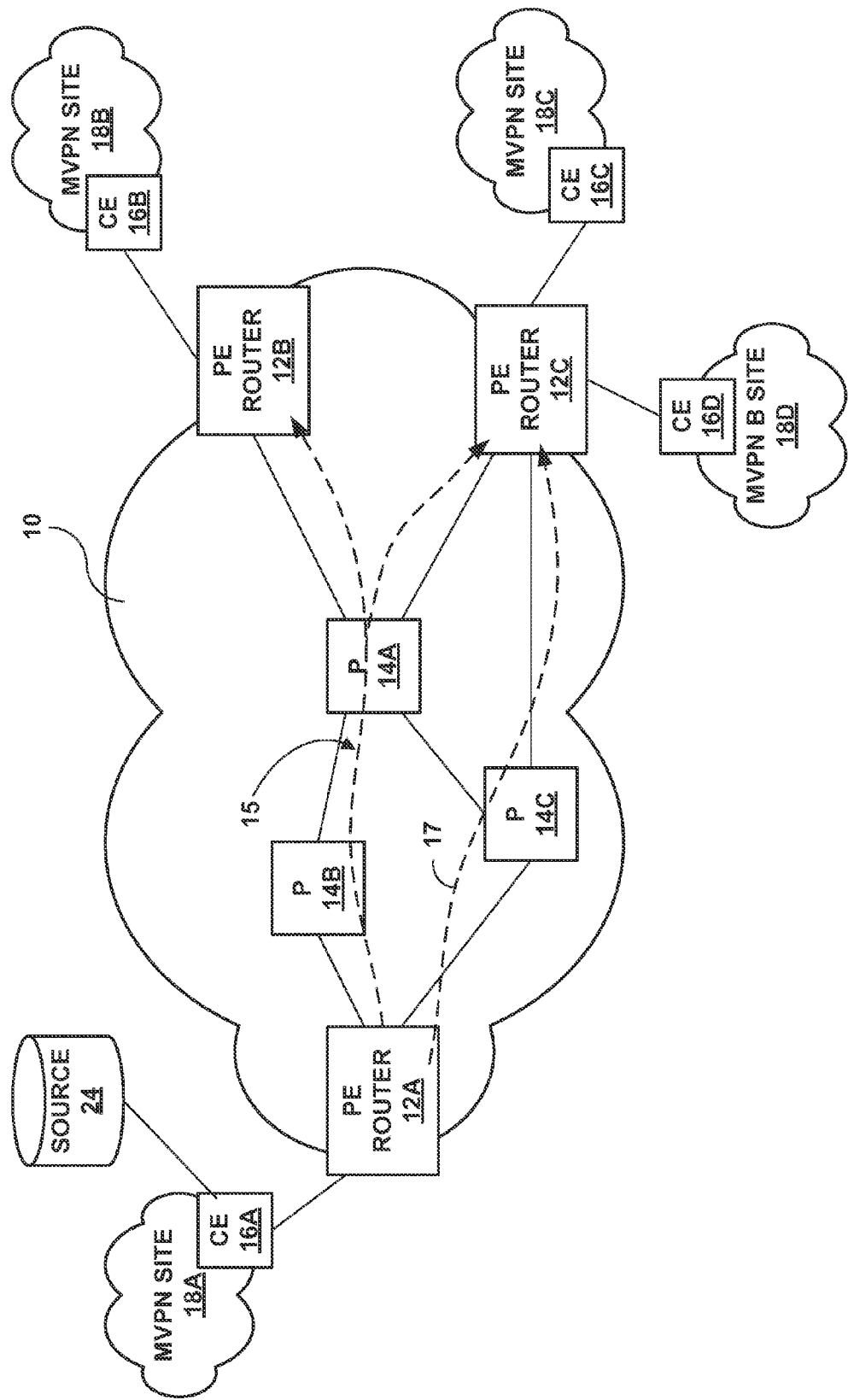
FIG. 1 is a block diagram illustrating an example service provider (SP) network in which techniques described herein may be implemented.

FIG. 1 is a block diagram illustrating an example service provider (SP) network 10 in which provider edge (PE) routers 12A-12C ("PE routers 12") establish a point-to-multipoint (P2MP) distribution tree across the SP network 10. For example, PE routers 12 and intermediate provider routers 14A-14D may establish the P2MP distribution tree within SP network 10 as a P2MP label switched path (LSP) 15 using any of a variety of MPLS protocols, such as label distribution protocol (LDP) or the resource reservation protocol (RSVP), which may be extended to include traffic engineering (TE).

In one example, PE routers 12 provide multicast virtual private network (MVPN) services to one or more of the MVPN sites 18A-18C via customer edge (CE) routers 16A-16E ("CE routers 16"). In this example, P2MP LSP 15 may comprise a P2MP LSP that transports L3 multicast traffic from a multicast source 24 to subscriber devices within at least one of MVPN sites 18 coupled to PE routers 12. For example, P2MP LSP 15 may carry L3 multicast traffic, such as Internet Protocol Television (IPTV), desktop conferences, corporate broadcasts, music and video web casts, and other forms of multimedia content, from multicast source 24 to subscriber devices within MVPN sites 18B, 18C. Example details for establishing P2MP LSPs for MVPNs are described in U.S. Pat. No. 7,522,599 entitled "LABEL SWITCHING MULTICAST TREES FOR MULTICAST VIRTUAL PRIVATE NETWORKS," incorporated herein by reference.

SP network 10 may comprise one or more service provider networks or another intermediate private or public network. In some cases, SP network 10 may comprise a multi-protocol label switching (MPLS) network. Each of MVPN sites 18 may include a local area network (LAN) or a wide area network (WAN) that comprises a plurality of subscriber devices, such as desktop computers, laptops, workstations, PDAs, wireless devices, network-ready appliances, file servers, print servers or other devices.

Routers 12, 14 are connected to one another through links represented by lines in FIG. 1. For instance, PE router 12A is connected to routers 14B, 14C. The links may be any type of computer network transmission medium. For instance, a link in network 10 may be a fiber optic cable, an Ethernet cable, a wireless connection, and so on. While network 10 is operating, a link or a node (e.g., routers 12, 14) in network 10 may fail. For example, a storm may sever the link between PE router 12A and router 14C. As another example, a power failure, hardware failure or a programming fault may cause router 14B to stop functioning. Failure of a link or node may occur without warning to nodes that use the link or node to communicate. Consequently, for a period of time, a node may continue sending messages through a path that is no longer functioning. Packets sent through such a path may be lost or delayed.

In accordance with the techniques of the invention, routers 12, 14 utilize connectivity protocols to monitor and verify that each of the paths of P2MP LSP 15 of P2MP LSP 15 are working properly. For example, in one embodiment, PE router 12A utilizes the P2MP LSP ping protocol as a first connectivity protocol to probe P2MP LSP 15 to learn of the multiple paths and provide extensive testing of each path 22 along P2MP LSP 15. P2MP LSP ping provides an extensive mechanism for probing and testing the P2MP LSP 15 and to verifying the data plane of P2MP LSP 15 against the control plane of the routers along the path. However, due to the overhead and resource consumption of LSP ping, PE router 12A may execute an extensive LSP ping test of P2MP LSP 15 at a low frequency, e.g., once every minute.

In addition, PE router 12A may utilize the Multipoint Bidirectional Forwarding Detection (MP BFD) protocol as a second connectivity protocol to provide a more efficient connectivity test for the paths of P2MP LSP 15. For example, PE router 12A may utilize the MP BFD protocol to detect a data plane failure in the forwarding path of P2MP LSP 15. Although the MP BFD protocol typically cannot be used to verify the MPLS control plane against the data plane, BFD can be used, as described herein, to detect data plane failures.

In other words, routers 12 14 may utilize the MP BFD protocol as a light-weight means of testing only the data plane. The light-weight nature of the MP BFD protocol may allow routers 12, 14 to implement the MP BFD protocol in hardware or firmware. The MP BFD protocol may provide faster detection with sub-second granularity of data plane failures, and may be used for a greater number of LSPs. For example, PE router 12A may execute a low-cost BFD test of P2MP LSP 15 at a higher frequency, e.g., once every 10 milliseconds, between iterations of the more extensive LSP ping protocol used to periodically verify the control plane against the data plane by re-synchronizing MPLS P2MP LSP 15 and Forwarding Equivalence Class (FEC) mappings. Further details on the MP BFD protocol are described in D. Katz and D. Ward, "BFD for Multipoint Networks," Internet Engineering Task Force (IETF), draft-ietf-bfd-multipoint-00.txt, Oct. 11, 2011, incorporated herein by reference.

Moreover, in one example, PE router 12A uses LSP ping exploration packets according to the P2MP LSP ping protocol (i.e., a first connectivity protocol) to learn of the paths of P2MP LSP 15 and concurrently learn information that will cause packets conforming to the LSP ping protocol as well as packets conforming to BFD protocol to traverse the paths of P2MP LSP 15. Consequently, PE router 12A does not need to use the MP BFD protocol to learn information that will cause packets conforming to the MP BFD protocol to traverse the paths of P2MP LSP 15. For example, the LSP ping protocol may be utilized to concurrently discover packet header information necessary to direct packets along the paths of P2MP LSP 15 for both connectivity protocols. In one embodiment, PE router 12A uses the LSP ping protocol to determine paths through a network for a multi-path LSP, and concurrently determine packet header information necessary to direct LSP ping packets as well as BFD packets along each of the paths of P2MP LSP 15. Thus, PE router 12A may be viewed as using LSP ping to boot-strap a BFD session. The initiation of fault detection for a particular <MPLS LSP, FEC> combination results reply packets, in the ping mode, between the ingress and egress LSRs for that <MPLS LSP, FEC> (router 12A, routers 12B, 12C) in the example of FIG. 1). An LSP ping echo request from PE router 12A and echo reply messages from intermediate nodes along P2MP LSP 15 carry a BFD discriminator TLV for the purpose of session establishment. Further details of use of LSP ping to boot-strap a BFD session are described in U.S. Pat. No. 7,852,778, "Verification of Network Paths Using Two or More Connectivity Protocols," the entire contents being incorporated herein by reference.

Further, as described herein, LSP ping may be further modified so as to facilitate bootstrapping BFD over a P2MP LSP, such as P2MP LSP 15 of FIG. 1. For P2MP LSPs, there are many scenarios where making the association of an incoming BFD packet with its corresponding P2MP LSP becomes a challenge at the egress. For example in case of Penultimate Hop Popping (PHP) for a single label stack P2MP LSP, incoming BFD packets at the egress (i.e., routers 12B, 12C in FIG. 1) do not contain enough information to associate them with a particular P2MP LSP because the label stack has been removed by the time the BFD packet reaches the egress router. Moreover, in a P2MP LSP environment, it is not unusual to have a very scaled and dynamic network where a single head (PE router 12A in FIG. 1) can possibly have thousands of egress routers (PE routers 12B, 12C) with many of the egress routers going down and coming back up without the ingress ever be informed. In such scenarios it may be a challenge to establish BFD sessions with each egress router using conventional techniques.

In such scenarios, one example technique to bootstrap a BFD session in egress routers 12B, 12C is for ingress PE router 12A to periodically send out LSP ping packets containing the LSP information along with the BFD discriminator chosen for P2MP LSP 15. That is, the LSP ping packet for P2MP LSP 15 embeds the BFD discriminator, thus making the association between the MP BFD session and a particular multipoint tree. Unlike bootstrapping BFD for a point-to-point (P2P) LSP, ingress router 12A includes certain data within the LSP ping request to instruct egress nodes 12B, 12C to not reply to the initial LSP ping request initiating a BFD session even though a session has not yet been established. That is, BFD for a P2P LSP may require a two-way handshake involving an LSP ping echo request packet and an LSP ping echo reply packet that each specify the appropriate local discriminator for the MP BFD session prior to BFD packets flowing for the P2P LSP. However, this may be unworkable for P2MP LSP scenarios with hundreds or thousands of egress routers that may continue to come up and go down or otherwise leave a service, such as MVPN. As such, ingress node 12A may configure the initial LSP ping message to bootstrap the message so as to disable any LSP ping echo reply message and, moreover, may operate as if a unidirectional MP BFD session has been established without requiring completion of any two-way handshake, e.g., receipt of the LSP echo reply message, as with P2P BFD. As such, no full LSP ping handshake is required and router 12A may treat the MP BFD session as being established and, regardless, periodically send out the P2MP LSP ping echo request packets with the bootstrap information for the MP BFD session for any newly activated egress routers. This may be advantageous in that, when an egress router first comes up, the egress router may immediately receive incoming BFD packets from P2MP LSP 15 but will be unable to make an association to a particular LSP (i.e, P2MP LSP 15 in this example) until the egress routers receives an LSP ping echo request packet from PE router 12A. The newly available egress router may elect to either reject incoming BFD packets until the egress router receives an LSP ping message requesting the egress router to accept BFD packets with a particular discriminator and source address, or the egress router can dynamically establish the MP BFD session but keep that BFD session clientless until it receives the ping with the necessary bootstrapping information. This elegant approach allows ingress (head) router 12A to periodically send P2MP LSP ping packets containing the discriminator without ever needing to maintain state as to the operational availability of any one particular egress router. Moreover, this may reduce bandwidth utilization within SP network 10.

In a second example, application-driven mechanisms are used to asynchronously trigger bootstrap of an MP BFD session on an egress router. For example, MPLS protocols used to establish the P2MP LSPs, such as RSVP or LDP, may not always know when a new egress router is being added to the P2MP distribution tree. However, in the example of FIG. 1, the MVPN application service executing within service provider network 10 that is setting up LSPs within network 10 may typically be configured so as to be aware when egress routers are being added to the MVPN service. If the MVPN application service is aware of a new egress router being added to the multipoint tree (e.g., router 12C being added to connect a new customer site 18C to P2MP LSP 15), the MVPN application service may direct the head node (PE router 12A) to output an expedited ping request to that particular node that has been newly added to the multipoint tree. For example, an MVN application executing in the control plane of router 12C may asynchronously send a request for router 12A to send an expedited ping request to router 12C containing the BFD bootstrap information. This may ensure that the bootstrapping of the MP BFD session between routers 12A, 12C is done as soon as the newly added egress node (router 12C) comes up and, therefore, need not have to wait for the next periodic output of LSP ping packets for P2MP LSP 15 by PE router 12A. In this example, the application-driven LSP ping packets may be targeted to a specific egress router or a subset of egress routers that may have recently come up and been connected as part of the MVPN service. As such, bootstrapping of a BFD session with a newly added egress router happens almost immediately as the egress router comes up since the MVPN application may request an expedited LSP ping as soon as the application becomes aware of the new egress node for P2MP LSP 15. Moreover, since the LSP ping sent may be targeted to a particular egress node, which may avoid flooding the entire tree periodically.

Once P2MP LSP ping has been used to convey information to egress routers 12B, 12C of P2MP LSP 15, PE routers 12 may use either or both of the P2MP LSP ping protocol and the MP BFD protocol to monitor and verify the connectivity status of each of the paths of P2MP LSP 15. For example, PE routers 12 may periodically use the P2MP LSP ping protocol, but primarily rely on the P2MP BFD protocol, which is a more efficient, less resource intensive protocol for testing connectivity. For example, PE router 12A may output LSP ping packets at a first rate (e.g., once every minute) in accordance with the learned packet header information to perform a first verification of a connectivity status of each of the paths of P2MP LSP 15. In addition, PE router 12A may output BFD packets at a second rate (e.g., every 10 milliseconds) in accordance with the learned packet header information to perform a higher frequency verification of the status of each of the paths of P2MP LSP 15. Having been informed of BFD session information, PE routers 12B, 12C are able to detect a loss in connectivity along the multipoint path to ingress router 12A of P2MP LSP 15 and immediately take failover action should data plane connectivity failure be detected.

The techniques of this invention may present one or more advantages. For example, by detecting the loss of connectivity of along the multipoint path of a P2MP LSP at an egress router (PE routers 12B, 12C), redundancy may be achieved by allowing the egress router to elect to switch to a backup stream of data rather than the receiver. For example, upon detecting connectivity failure for P2MP LSP 15, PE router 12C may select a different, redundant stream 17 for traffic otherwise flowing along P2MP LSP 15. In addition, utilizing the techniques described herein, various mechanisms like fast switchover and other failure actions can be implemented in the last hop routers of the P2MP LSPs (i.e., egress routers 12B, 12C).

In this way, use of unidirectional P2MP BFD along the multipoint path of the P2MP LSP 15 gives the egress routers 12B, 12C enough context such that the routers can select between any redundant streams and forward the selected stream to the receivers within MVPN sites 18B-18D, thereby reducing the bandwidth requirement between the last hop routers and the receivers since the duplicate streams need not be forwarded to the receivers anymore. Further, for applications of P2MP LSPs that do not have a continuous stream of traffic flowing over the multipoint tree, use of P2MP BFD may ensure that there is a continuous stream of BFD packets being received on the P2MP LSP and any break in the reception of these BFD packets can be used as an indicator that the multipoint forwarding tree for the P2MP LSP has failed. This allows the affected egress routers to respond and invoke failover mechanisms. Further, P2MP BFD provides a reliable method for detection of failures in the data plane of the multipoint tree. Applications, such as MVPN, can be built on top of this to leverage the fact that BFD can be run on the hardware and therefore detect failures much faster compared to proprietary solutions at the receiver.

Figure 2:
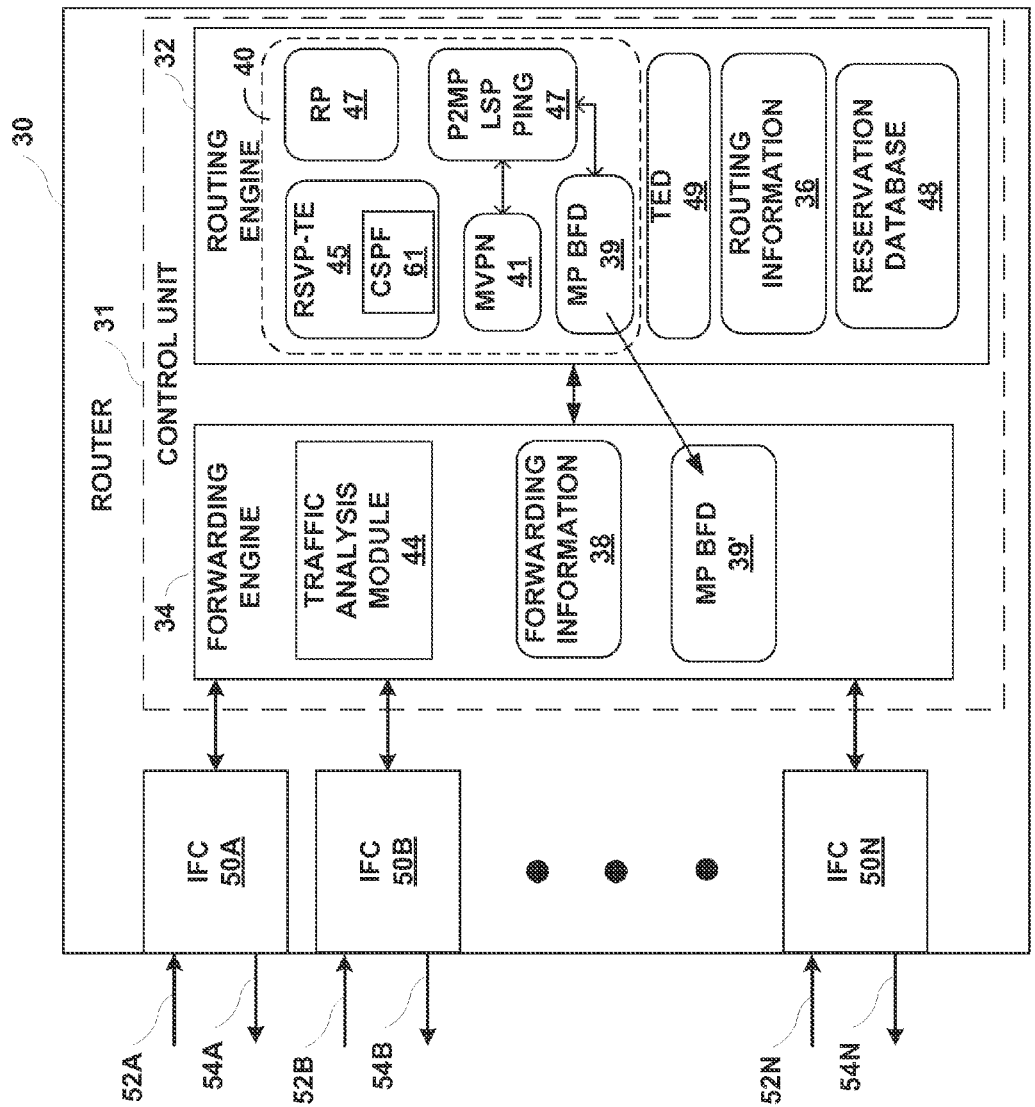
FIG. 2 is a block diagram illustrating an exemplary router in accordance with the disclosure herein.

FIG. 2 is a block diagram illustrating an example an exemplary router 30 in accordance with this disclosure. Router 30 may, for example, represent any of routers 12, 14 of FIG. 1.

In this example, router 30 includes a control unit 31 that comprises a routing engine 32 and a forwarding engine 34. In addition, router 30 includes a set of interface cards (IFCs) 50A-50N (collectively, "IFCs 50") for communicating packets via inbound links 52A-52N (collectively, "inbound links 52") and outbound links 54A-54N (collectively, "outbound links 54").

Routing engine 32 primarily provides an operating environment for control plane protocols 50. For example, one or more routing protocols ("RP") 47 maintain routing information 36 to reflect the current topology of a network and other network entities to which it is connected. In particular, RP 47 updates routing information 36 to accurately reflect the topology of the network and other entities. Example routing protocols include Multi-Protocol Border Gateway Protocol (mp-BGP), the Intermediate System to Intermediate System (ISIS) routing protocol, the Open Shortest Path First (OSPF) routing protocol and the like.

Routing engine 32 generates and programs forwarding engine 34 with forwarding information 38 that associates network destinations with specific next hops and corresponding interfaces ports of IFCs 50 in accordance with routing information 36. Routing engine 32 may generate forwarding information 38 in the form of a radix tree having leaf nodes that represent destinations within the network.

Based on forwarding information 38, forwarding engine 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution, the contents of which is incorporated herein by reference in its entirety.

In one example, forwarding engine 34 is a rich and dynamic shared forwarding plane, optionally distributed over a multi-chassis router. Moreover, forwarding plane 34 may be provided by dedicated forwarding integrated circuits normally associated with high-end routing components of a network router. Further details of one example embodiment of router 40 can be found in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," which is incorporated herein by reference.

As shown in FIG. 2, protocols 40 executing within routing engine 32 includes one or more MPLS protocols for establishing a P2MP LSP. For example, RSVP-TE 45 may generate and maintain a traffic engineering database 49, including bandwidth reservations for paths associates with MPLS LSPs. Constrained Shortest Path First (CSPF) process 61 computes a shortest path or paths for an MPLS LSP based on specified constraints and bandwidth availability information associated with the links within the network. RP 47 may, in turn, advertise the calculated bandwidth availability information in TED 49 to other peer routers.

Moreover, as shown in FIG. 2, protocols 40 may include LSP ping protocol 47 and BFD protocol 39 that operates as described herein. For example, P2MP LSP ping protocol 47 executes to probe and test a P2MP LSP and to verifying the data plane of routers along the P2MP LSP against their control plane. In addition, P2MP LSP ping protocol 47 has been extended so as to facilitate bootstrapping MP BFD over a P2MP LSP, such as P2MP LSP 15 of FIG. 1. In one example, router 30 operates as an ingress router (head node) of a P2MP LSP such that LSP ping protocol 47 bootstraps MP BFD sessions between MP BFD protocol 39 and MP BFD protocols executing on other routers associated with the P2MP LSP. For example, P2MP LSP ping protocol 47 protocol interacts with MP BFD protocol 39 to periodically send out LSP ping packets that embedded with MPLS label information for a P2MP LSP and a BFD discriminator chosen for the P2MP LSP.

Further, protocols 40 may execute one or more service-level applications, such as multicast virtual private network (MVPN) service 41. In the example of FIG. 2, MVPN service 41 asynchronously triggers bootstrap of BFD sessions for a P2MP LSP via LSP ping protocol 47. For example, when router 30 operates as an ingress router for a P2MP LSP, MVPN service 41 may receive communications from other MVPN service 41 executing on other routers indicating that the other routers are now connected as egress nodes to a service provided by a P2MP LSP, such as an MVPN service in which VPN traffic is distributed via the P2MP LSP. In response to the communication, MVPN service 41 may immediately direct LSP ping protocol 47 to output an expedited LSP ping request to a particular node that has recently connected to the MVPN service, where the LSP ping request has been constructed by LSP ping protocol 47 to embed the BFD discriminator selected for that particular P2MP LSP. In this way, MVNP service 41 executing on a head node of a P2MP LSP may asynchronously trigger application-specific BFD bootstrapping for services provided by a P2MP LSP. Moreover, LSP ping protocol 47 may construct the LSP ping request so as to direct the LSP ping request to a particular node or nodes, such as recently added egress routers.

When operating as an egress node for a P2MP LSP, P2MP LSP ping protocol 47 receives incoming LSP ping requests originally send from a source router of the P2MP LSP. LSP ping protocol 47 processes the LSP ping requests to extract the embedded MPLS label(s) that are used to identify the P2MP LSP as well as the corresponding MP BFD discriminator mapped to the P2MP LSP by the source router. LSP ping protocol 47 programs the BFD discriminator into MP BFD protocol 39, thereby establishing the MP BFD session for the P2MP LSP. At this point, MP BFD protocol may be used as a second connectivity protocol to provide a more efficient connectivity test for the paths of P2MP LSP, even within an egress router where BFD packets may arrive at the egress router (e.g., routers 12B, 12C of FIG. 1) having the label stack associated with the P2MP LSP fully removed and, therefore, otherwise be unassociable with the P2MP LSP but for the BFD discriminator carried by the BFD packets. As such, router 30 operating as an egress router may utilize BFD protocol 39 to quickly detect a data plane failure in the forwarding path of P2MP LSP 15. As shown in FIG. 2, BFD protocol 39 of routing engine 32 may program BFD logic 39' in forwarding engine 34 or similar logic (not shown) in any of IFCs 50 that utilize the BFD discriminator to monitor incoming BFD packets are report a data plane failure for the P2MP LSP, thereby allowing routing engine 32 to respond to failure events associated with the P2MP LSP.

In one embodiment, each of forwarding engine 34 and routing engine 32 may comprise one or more dedicated processors, hardware, and/or computer-readable media storing instructions to perform the techniques described herein. Forwarding engine 34 and routing engine 32 may be communicatively coupled by a data communication channel. The data communication channel may be a high-speed network connection, bus, shared-memory or other data communication mechanism.

The architecture of router 30 illustrated in FIG. 2 is shown for exemplary purposes only. In other embodiments, router 30 may be configured in a variety of ways. In one embodiment, for example, control unit 31 and its corresponding functionality may be distributed within IFCs 50.

Control unit 31 may be implemented solely in software, or hardware, or may be implemented as a combination of software, hardware, or firmware. For example, control unit 31 may include one or more processors which execute software instructions. In that case, the various software modules of control unit 31, such as protocols 40, may comprise executable instructions stored on a computer-readable medium, such as computer memory or hard disk.

Figure 3:
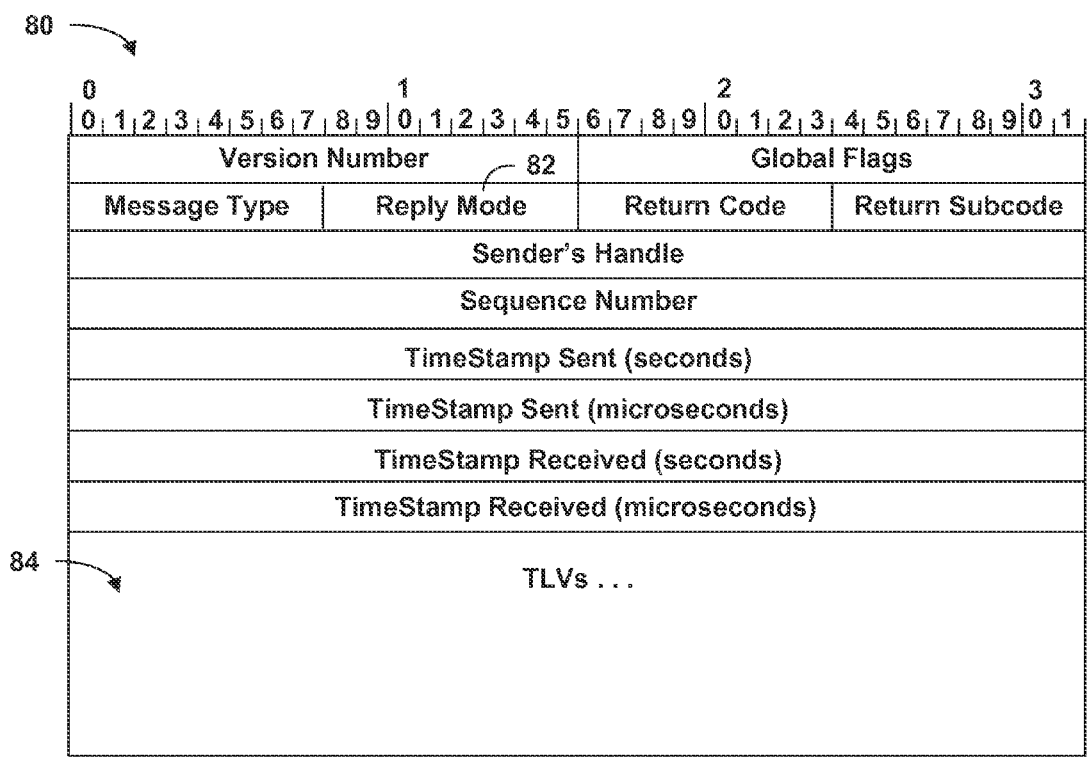
FIG. 3 is an example illustration of an example LSP ping packet constructed that may be used in accordance with the techniques described herein.

FIG. 3 is an example illustration of an example LSP ping packet constructed that may be used in accordance with the techniques described herein. In the example of FIG. 1, LSP ping echo request 80 having a variety of fields, including a reply mode 82. In one example, reply mode field may support four reply modes: (1) do not reply, (2) reply via an IPv4/IPv6 UDP packet, (3) reply via an IPv4/IPv6 UDP packet with Router Alert, and (4) reply via application level control channel. Further example details of LSP ping are described in RFC 4379, as previously incorporated herein by reference.

As described, one example technique to bootstrap a BFD session in egress routers 12B, 12C is for ingress PE router 12A to periodically send out LSP ping packets containing the LSP information along with the BFD discriminator chosen for P2MP LSP 15. This information may be, for example, may be carried in a defined BFD discriminator TLV within TLVs 84. That is, to establish a BFD session for a particular <MPLS LSP, FEC> combination, LSP ping Echo request 80 includes a BFD discriminator TLV that carries the local discriminator assigned by the ingress LSR for the MP BFD session for that <MPLS LSP, FEC> combination. Unlike a point-to-point P2P LSP, ingress router 12A specifies a do not reply option within reply mode 82 to instruct egress nodes 12B, 12C to not reply to the LSP ping request, i.e., disabling echo reply turned.

In another example, as described above, an application service executing within the service provider network may direct the ingress router to asynchronously send an expedited LSP ping echo request to a target set of one or more egress routers so as to bootstrap BFD sessions on those routers with respect to a particular P2MP LSP. In this example, the ingress router may construct LSP ping echo request 80 of FIG. 3 as an IPv4 or IPv6 UDP packet having a specific IP address for a targeted egress router. As such, the ingress router may embed the BFD discriminator for the MP BFD session within the BFD discriminator TLV of TLVs 84, and may set reply mode 84 to any of the reply modes.

Various embodiments of the invention have been described. These and other embodiments are within the scope of the following claims.

The invention claimed is:

1. A method of verifying connectivity of paths through a computer network containing a plurality of network devices, the method comprising:
   establishing a Multi-Protocol Label Switching (MPLS) point-to-multipoint (P2MP) label switched path (LSP) for transporting packets through a network, wherein the P2MP LSP includes a source device providing an ingress to the P2MP LSP and a plurality of destination devices providing a plurality of different egress devices from the P2MP LSP;
   using a P2MP Label Switched Path (LSP) ping protocol, sending an LSP ping echo request along the P2MP LSP, wherein the LSP ping echo request embeds a discriminator to establish a Multipoint Bidirectional Forwarding Detection (MP BFD) session for testing connectivity of the P2MP LSP in accordance with a MP BFD protocol, and wherein the LSP ping echo request includes an indicator specifying that the egress devices of the P2MP LSP should not reply to the LSP ping echo request with an LSP ping echo reply to establish the MP BFD session; and
   without receiving an LSP ping echo reply from the egress devices, initiating connectivity verification of the P2MP LSP by outputting BFD packets on the MP BFD session with the ingress device according to the MP BFD protocol.

2. The method of claim 1, wherein the source device and egress devices are members of a multicast virtual private network (MVPN), and wherein the P2MP LSP transports multicast data for the P2MP LSP.

3. The method of claim 1, wherein the LSP ping Echo request includes a type-length-value (TLV) to carry the discriminator for the MP BFD session.

4. The method of claim 1, further comprising:
   receiving the BFD packets for the P2MP LSP with at least one of the egress devices prior to receiving the LSP ping echo request;
   associating the BFD packets with a client-less BFD session; and
   upon receiving the LSP ping echo request and without outputting an LSP ping echo reply, associating the BFD packets with the MP BFD session for the P2MP LSP.

5. The method of claim 1, further comprising:
   receiving the BFD packets for the P2MP LSP with at least one of the egress devices prior to receiving the LSP ping echo request; and
   rejecting the BFD packets for the P2MP LSP with the at least one of the egress devices until receiving the LSP ping echo request.

6. The method of claim 1,
   wherein sending an LSP ping echo request along the P2MP LSP comprises periodically sending LSP ping echo requests along the P2MP LSP, and
   wherein each of the LSP ping echo requests includes an indicator specifying that the egress devices of the P2MP LSP should not reply to the respective LSP ping echo request with an LSP ping echo reply to establish the MP BFD session.

7. The method of claim 1, further comprising:
   detecting, with an application service executing within the computer network, a new egress device joining the application service and providing an egress to the P2MP LSP; and
   with the application service, directing the source device to use the LSP ping protocol to send the LSP ping echo request along the P2MP LSP and addressed to the new egress device.

8. A method of verifying connectivity of paths through a computer network containing a plurality of network devices, the method comprising:
   establishing a Multi-Protocol Label Switching (MPLS) point-to-multipoint (P2MP) label switched path (LSP) for transporting packets through a network, wherein the P2MP LSP includes a source device providing an ingress to the P2MP LSP and a plurality of destination devices providing a plurality of different egress devices from the P2MP LSP;
   detecting, with an application service executing within the computer network, a new egress device joining the application service and providing an egress to the P2MP LSP;
   with the application service, directing the source device to use a P2MP Label Switched Path (LSP) Ping protocol to send an LSP ping echo request along the P2MP LSP and addressed to the new egress device, wherein the LSP ping echo request embeds a discriminator to establish a Multipoint Bidirectional Forwarding Detection (MP BFD) session for testing connectivity of the P2MP LSP in accordance with the MP BFD protocol wherein the LSP ping echo request includes an indicator specifying that the egress devices of the P2MP LSP should not reply to the LSP ping echo request with an LSP ping echo reply to establish the MP BFD session; and initiating connectivity verification of the P2MP LSP by outputting BFD packets, with the ingress device, on the MP BFD according to the MP BFD protocol.

9. The method of claim 8, wherein the application service comprises a multicast virtual private network (MVPN).

10. The method of claim 8, wherein outputting BFD packets according to the MP BFD protocol comprises outputting the packets according to the Bidirectional Forwarding Detection protocol for the MP BFD session without receiving an LSP ping echo reply from the egress devices.

11. The method of claim 8, further comprising:
receiving the BFD packets for the P2MP LSP with at least one of the egress devices prior to receiving the LSP ping echo request;
associating the BFD packets with a client-less BFD session; and
upon receiving the LSP ping echo request and without outputting an LSP ping echo reply, associating the BFD packets with the MP BFD session for the P2MP LSP.

12. A network device comprising:
a control unit comprising hardware to execute a label distribution protocol to establish a Multi-Protocol Label Switching (MPLS) point-to-multipoint (P2MP) label switched path (LSP) for transporting packets through a network, wherein the P2MP LSP includes a source device providing an ingress to the P2MP LSP and a plurality of destination devices providing a plurality of different egress devices from the P2MP LSP;
an Label Switched Path (LSP) Ping protocol executing within the control unit to send an LSP ping echo request along the P2MP LSP, wherein the LSP ping echo request embeds a discriminator to establish a Multipoint Bidirectional Forwarding Detection (MP BFD) session for testing connectivity of the P2MP LSP in accordance with the MP BFD protocol, and wherein the LSP ping echo request includes an indicator specifying that the egress devices of the P2MP LSP should not reply to the LSP ping echo request with an LSP ping echo reply to establish the MP BFD session; and
a BFD protocol module executing within the control unit to, without receiving an LSP ping echo reply from the egress devices, initiating connectivity verification of the P2MP LSP by outputting BFD packets on the BFD session according to the MP BFD protocol.

13. The network device of claim 12, wherein the LSP ping Echo request includes a type-length-value (TLV) to carry the discriminator for the MP BFD session.

14. The network device of claim 12, wherein sending an LSP ping echo request along the P2MP LSP comprises periodically sending LSP ping echo requests along the P2MP LSP.

15. The network device of claim 12, wherein the MP BFD protocol module operates within a forwarding plane of the network device.

16. The network device of claim 12, further comprising:
an application service executing within the control unit, wherein the application service detects a new egress device joining the application service and directs the source device to use the LSP ping protocol to send the LSP ping echo request along the P2MP LSP and addressed to the new egress device.

17. The network device of claim 12, wherein the application service comprises a multicast virtual private network (MVPN).

18. A network device comprising:
a control unit comprising hardware to execute an application service, an Multi-Protocol Label Switching (MPLS) protocol, a point-to-multipoint (P2MP) Label Switched Path (LSP) Ping protocol, and a Multipoint Bidirectional Forwarding Detection (MP BFD) protocol module;
wherein the MPLS protocol establishes a Multi-Protocol Label Switching (MPLS) P2MP label switched path (LSP) for transporting packets for the application service through a network, wherein the P2MP LSP includes a source device providing an ingress to the P2MP LSP and a plurality of destination devices providing a plurality of different egress devices from the P2MP LSP;
wherein the application service detects a new egress device joining the application service and directs the source device to use the LSP ping protocol to send an LSP ping echo request along the P2MP LSP and addressed to the new egress device, wherein the LSP ping echo request embeds a discriminator to establish a Multipoint Bidirectional Forwarding Detection (MP BFD) session for testing connectivity of the P2MP LSP in accordance with the MP BFD protocol, and wherein the LSP ping echo request includes an indicator specifying that the egress devices of the P2MP LSP should not reply to the LSP ping echo request with an LSP ping echo reply to establish the MP BFD session; and
wherein the MP BFD protocol module, without receiving an LSP ping echo reply from the egress devices, initiating connectivity verification of the P2MP LSP by outputting BFD packets on the MP BFD session according to the Bidirectional Forwarding Detection protocol.

19. The network device of claim 18, wherein the LSP ping Echo request includes a type-length-value (TLV) to carry the discriminator for the MP BFD session.

20. The network device of claim 18, wherein the MP BFD protocol module operates within a forwarding plane of the network device.

21. The network device of claim 18, wherein the application service comprises a multicast virtual private network (MVPN).

22. The method of claim 1, further comprising detecting, with one of the plurality of different egress devices, connectivity failure of the P2MP LSP using the MP BFD session without having output the LSP ping echo reply to establish the MP BFD session.

* * * * *